July 24, 1962 E. C. MARTIN 3,045,337
ARTICLE ASSEMBLING APPARATUS
Filed July 14, 1959 3 Sheets-Sheet 1
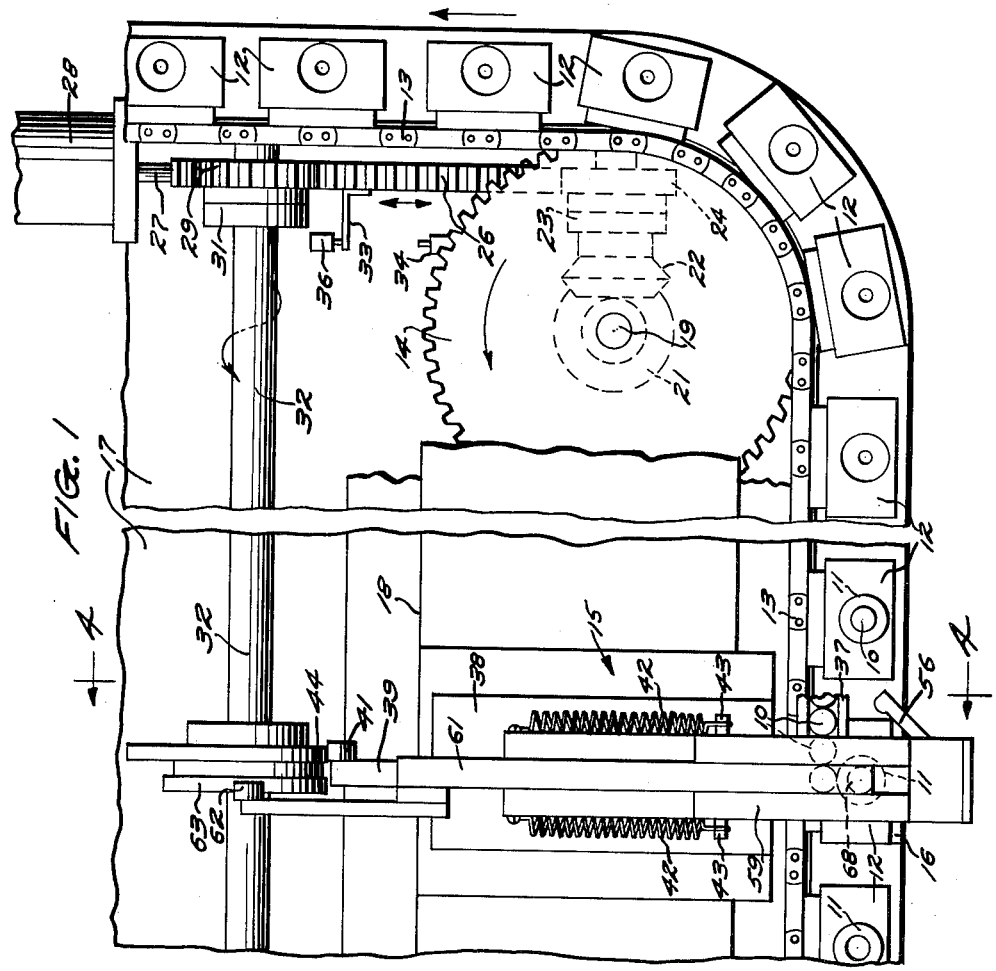
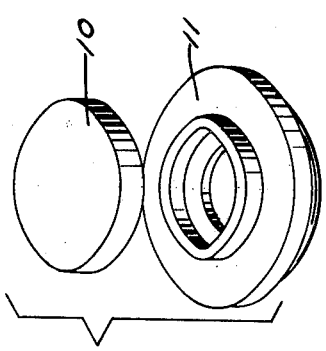
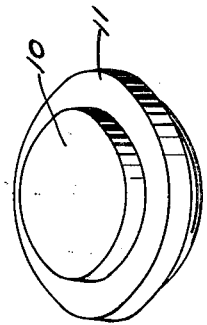
INVENTOR
E.C. MARTIN
BY R.P. Miller
ATTORNEY

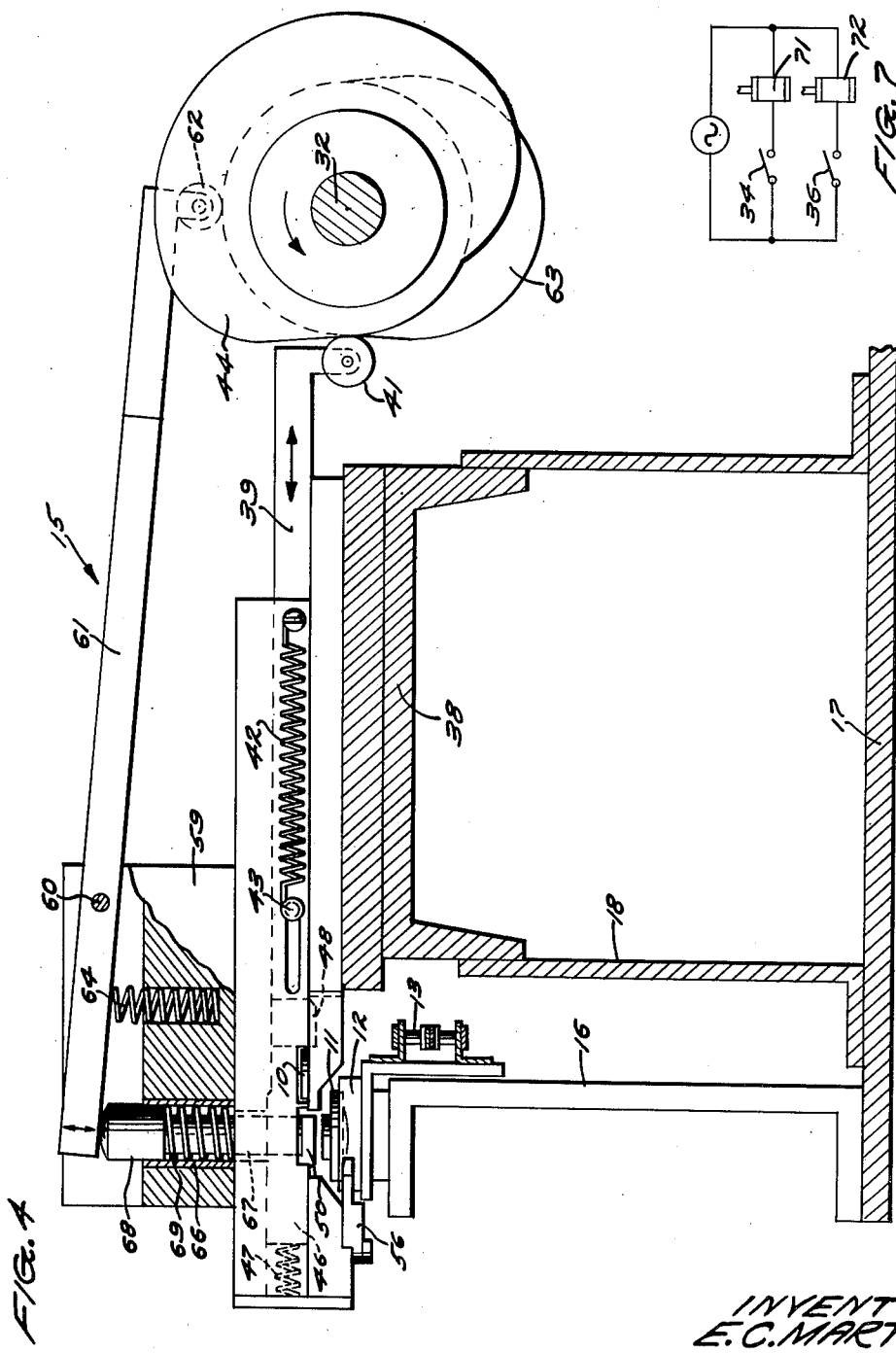

July 24, 1962  E. C. MARTIN  3,045,337
ARTICLE ASSEMBLING APPARATUS
Filed July 14, 1959  3 Sheets-Sheet 3

INVENTOR
E. C. MARTIN
BY R. P. Miller
ATTORNEY

United States Patent Office 3,045,337
Patented July 24, 1962

3,045,337
ARTICLE ASSEMBLING APPARATUS
Earl C. Martin, Dayton, Ohio, assignor, by mesne assignments, to Western Electric Company, Incorporated, New York, N.Y., a corporation of New York
Filed July 14, 1959, Ser. No. 827,096
4 Claims. (Cl. 29—211)

This invention relates to article assembling apparatus, and more particularly to apparatus for advancing caps from a chute onto an article positioned in a carrier of a conveyor system.

In automatic assembling machines, parts to be assembled are often carried by spring-loaded jaws so that feeding facilities may readily advance the parts from the holding jaws onto other parts or assemblies. When the parts are removed, the spring-urged jaws move against the components of the feeding facilities inflicting detrimental restraining forces which ultimately result in damage or binding of the facilities.

It is a principal object of the invention to provide a new and improved article assembling apparatus.

A further object of the invention resides in automatic facilities for feeding caps from a chute onto an article positioned in a carrier of a conveyor system.

An additional object of the invention is the provision of an article assembling apparatus having spring-loaded article holding jaws that are latched into position to preclude binding or damage to the assembling device following removal of an article from the jaws.

Another object of the invention resides in the combination of an assembling apparatus having selectively latched jaws together with an indexed carrier that is capable of releasing the latched jaws.

With these and other objects in view, the present invention contemplates the use of a conveyor system having carriers for advancing articles into a capping apparatus. The capping apparatus includes facilities for advancing a cap into engagement with a spring-urged holding jaw that is moved and latched in position whereafter a plunger is operated to advance the cap onto the article in the carrier. When the plunger is withdrawn, the carrier is indexed to engage a release mechanism that functions to unlatch the holding jaw.

Other objects and advantages of the present invention will be apparent from the following detailed description when considered in conjunction with the accompanying drawings, wherein—

FIG. 1 is a top plan view of a capping apparatus together with a carrier indexing system incorporating the principles of the present invention;

FIG. 2 is an exploded perspective view of a transmitter unit onto which a cap is placed by the apparatus shown in FIG. 1;

FIG. 3 is a perspective view of the assembled cap and transmitter unit;

FIG. 4 is a side sectional view, partially broken away, taken along line 4—4 of FIG. 1 showing the details of the capping apparatus;

FIG. 7 is a simplified schematic diagram of a circuit for controlling the cyclic operation of the apparatus shown in the other figures.

Figure 5:
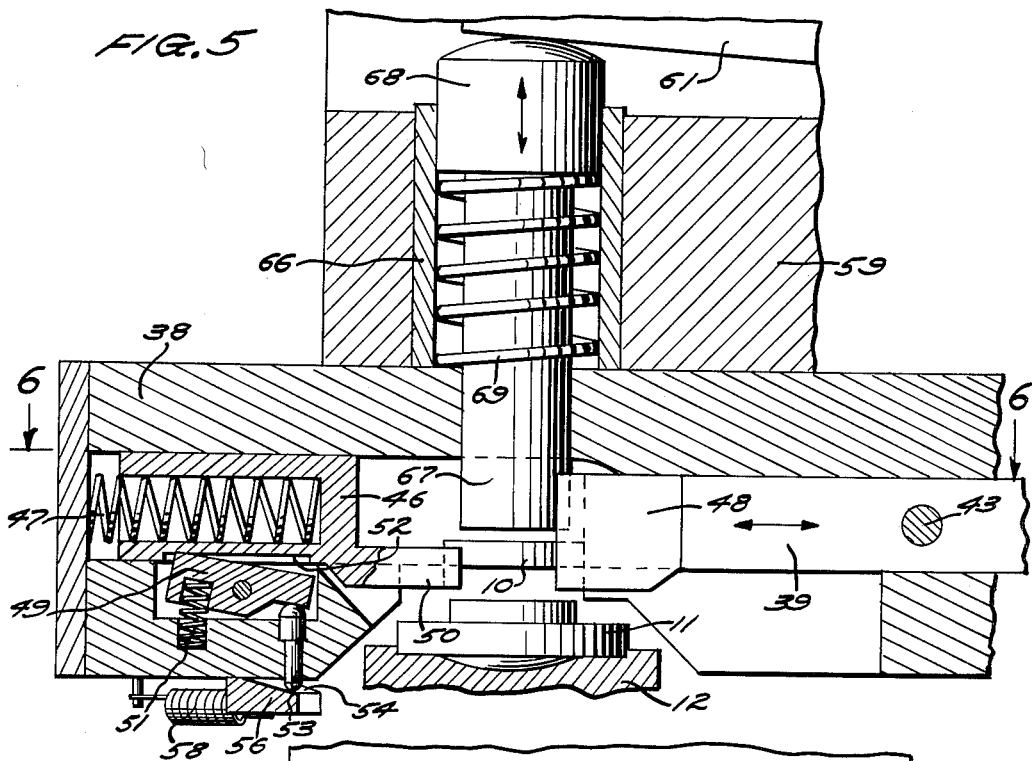
FIG. 5 is a sectional view taken along line 5—5 of FIG. 1 showing a latched jaw in conjunction with a cap advancing plunger.

Referring first to FIGS. 2 and 3, the apparatus of the present invention is designed to apply a cap 10 to an assembly 11 which may be a transmitter unit for use in a telephone set. The transmitter units 11 are mounted in a series of carriers 12 (see FIG. 1) that are cyclically indexed to a capping apparatus generally designated by the reference numeral 15. The carriers may be advanced through a series of other fabricating stations and eventually to an ejector station of the type shown in a copending application of H. W. Heidergott, Serial No. 821,150, filed June 18, 1959, and entitled "Article Advancing and Ejecting Apparatus."

Attention is directed to FIGS. 1 and 4 where the carriers 12 are shown as being attached to a chain 13 that is indexed by a sprocket wheel 14. The carriers 12 move along a C-shaped frame 16 attached to a base 17 having a housing 18 mounted thereon. The sprocket 14 is driven by a shaft 19 secured to a bevel gear 21 meshing with a bevel gear 22 that receives motion through a one-way clutch 23. Clutch 23 is attached to a pinion 24 meshing with a rack 26. Attached to one end of the rack 26 is a piston rod 27 extending into an air or hydraulic cylinder 28. The rack 26 is also adapted to drive a pinion 29 to operate a one-way clutch 31 to drive a cam shaft 32. The one-way clutches may be of the type shown in the copending application of L. E. Uffman, Serial No. 781,540, filed December 19, 1958, now U.S. Patent, 3,017,976, issued January 23, 1962, and entitled "Uni-Directional Clutch."

When the piston rod 27 moves from within the cylinder 28, the rack 26 is advanced to rotate the pinion 29 and drive the cam shaft 32 through the one-way clutch 31. The advance of the rack is accompanied by the advance of a switch actuator 33 that engages a switch 34 to operate a control circuit that functions to reverse the direction of air applied to the cylinder 28 whereupon the rack 26 moves toward the cylinder to rotate the pinion 24 and drive the bevel gear 22 through the one-way clutch 23. When motion is imparted to the bevel gear 22, the gear 21 and the shaft 19 are rotated to advance the sprocket 14 and the chain 13. Each movement of the chain 13 is effective to advance another carrier 12 into the capping apparatus 15. When the piston rod 27 is drawn substantially into the cylinder 28, the actuator 33 operates a switch 36 to again reverse the direction of air applied to the cylinder 28 thereby initiating another cycle of operation.

Caps 10 are advanced down an inclined chute, a portion of which is shown in FIG. 1 and designated by the reference numeral 37. The chute 37 is mounted on a horizontal frame 38 (see FIGS. 4 and 6) attached to the housing 18. The lowermost cap is positioned in alignment with a slide or pusher member 39 having a cam follower roller 41 mounted on one end thereof. A pair of springs 42 anchored to the frame 38 engage pins 43 extending from the slide 39 to thus urge the roller 41 into engagement with a cam 44 mounted on the shaft 32.

Figure 6:
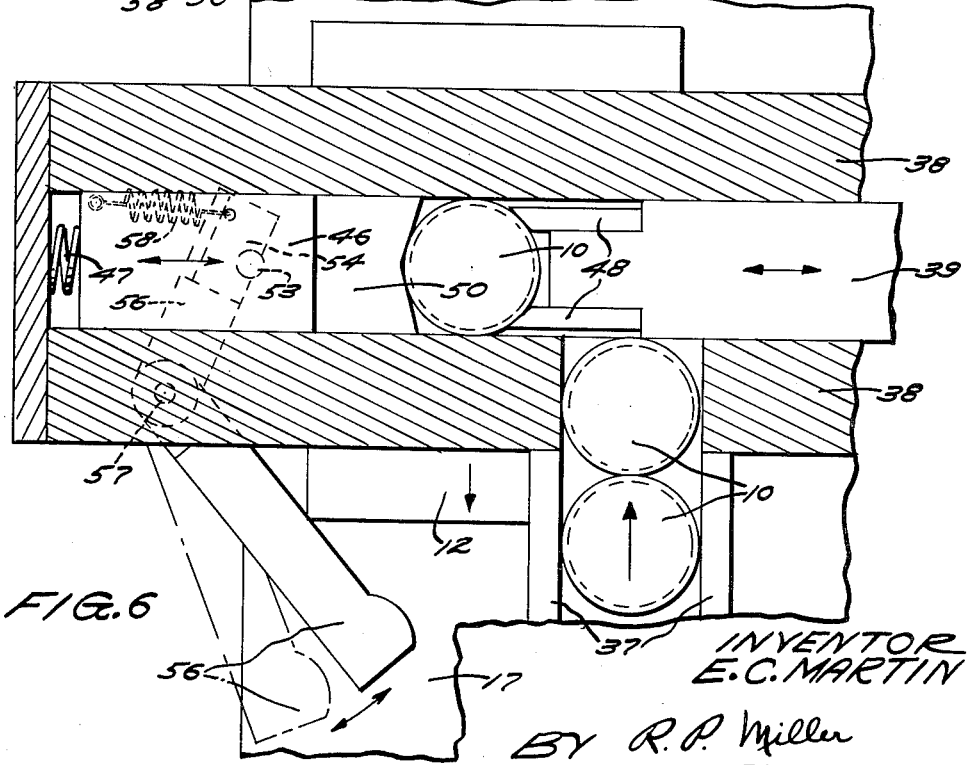
FIG. 6 is a sectional view taken along line 6—6 of FIG. 5 illustrating a carrier operated mechanism for releasing the latched jaw following a capping operation.

Referring now to FIGS. 5 and 6, a jaw 46 is shown as being slidably mounted within the frame 38 and is urged by a spring 47 toward the slide 39. The forward offset face 50 of the jaw 46 is dove-tailed to accommodate a cap 10. The slide 39 is provided with a pair of oppositely beveled gripping members 48. Pivotally mounted in the frame 38 is a latch 49 resiliently urged by a spring 51 to move toward the jaw 46 and into a holding slot 52 formed therein. Slidably mounted within the frame 38 is a release pin 53 which at one end engages the latch 49 and on the other end rides on a cam surface 54 formed in a lever 56 pivotally mounted about a stud shaft 57. One extremity of the lever 56 is attached to a tension spring 58 to urge the low portion of the cam surface 54 into engagement with the pin 53, thereby permitting the spring 51 to move the latch against the jaw 46. The spring 58 is also effective to move the lever so as to position the other end into the path of movement of the carrier 12.

Referring to FIGS. 1, 4 and 5, the frame 38 has a support block 59 mounted thereon and into which is mounted a pivot pin 60. A lever 61 is mounted on the pin 60 and has a cam follower roller 62 mounted on one end thereof to follow the contour of a cam 63 mounted on the shaft 32. A spring 64 is provided to pivot the lever 61 to urge the roller 62 into engagement with the cam 63. Slidably mounted within a bearing 66 secured within the block 59 is a plunger or assembling member 67 having an enlarged head 68 engaging the free extremity of the lever 61. The diameter of the plunger 67 is selected to be smaller than the diameter of the cap 10, hence permitting the plunger to engage and move a cap without engaging either the jaw 46 or gripping members 48 of the slide 39. A spring 69 engages the frame 38 to urge the head 68 into engagement with the lever 61.

For purposes of illustrating the operation of the overall capping apparatus, assume that the actuator 33 has closed the switch 34, an energizing circuit is completed for a solenoid 71 (see FIG. 7) that functions to control a valve member to admit air to the cylinder 28 to withdraw the piston rod 27 into the cylinder. Motion is thus transmitted by the rack 26 through the pinion 24, the clutch 23, the bevel gears 22 and 21, the shaft 19, the sprocket 14 and the chain 13 to advance a carrier 12 into the capping apparatus 15. A transmitter assembly 11 is thus positioned in alignment with the plunger 67 and simultaneously therewith the switch 36 is closed to energize a solenoid 72. This solenoid functions to control the valve associated with the cylinder 28, whereupon the piston 27 is moved from within the cylinder to advance the rack 26. Motion is then transmitted through the pinion 29 and one-way clutch 31 to the shaft 32. The cam 44 presents a lobe portion to the cam follower roller 41 to advance the slide 39 against the action of the spring 42. The leading cap 10 in the chute 37 is thus moved into engagement with the spring-loaded jaw 46. The jaw 46 is moved to depress the spring 47, and the latch 49 moves under the urging of the spring 51 into latching engagement within the holding slot 52. At this time the jaw 46 has moved a sufficient distance to position the cap 10 in alignment with the plunger 67.

The cam 63 now presents a lobe portion to the cam follower 62 thus pivoting the lever 61 to move against the action of the spring 64 and thereby move the head 68 and the plunger 67 in a downward direction to advance the cap from between the jaw 46 and the slide gripping members 43 onto the transmitter assembly 11. Following advance of the cap 10, the jaw 46 is latched in position to preclude engagement with the plunger 67. The cams 44 and 63 now present low portions to the respective followers 41 and 62 to sequentially withdraw the slide 39 and the plunger 67.

Upon subsequent operation of the indexing mechanism to advance the carrier 12 from within the capping apparatus 15, the carrier engages and pivots the lever 56 into the dotted line position as shown in FIG. 6. The cam surface 54 on the opposite extremity of the lever 56 acts against and moves the pin 53 to pivot the latch 49. As soon as latch 49 is clear of the slot 52, the spring 47 is effective to move the jaw 46 to the initial position in anticipation of another capping operation.

It is to be understood that the above-described arrangements of apparatus and construction of elemental parts are simply illustrative of an application of the principles of the invention and many other modifications may be made without departing from the invention.

What is claimed is:

1. Assembling apparatus comprising a first jaw member slidable horizontally for advancing an article from a feed position to an assembly position, supporting means arranged immediately below said first jaw member for supporting said article in said feed position and terminating short of said assembling position, a second jaw member movable in alignment with and resiliently biased toward said first jaw member, said second jaw member being engageable by an article being advanced by said first jaw member and serving in cooperation with said first jaw member to support said article in said assembling position, plunger means for removing an article from said jaw members in said assembling position, means removably positioned in the path of a portion of said second jaw member for limiting the movement of said second jaw member toward said first jaw member thereby to prevent said second jaw member from engaging said plunger means when said plunger means removes an article from said jaw members, and releasing means for moving said limiting means out of the path of said second jaw member after said plunger means have been withdrawn from between said jaw members to permit movement of said second jaw member such that it may be engaged by a succeeding article while said article is supported by said supporting means.

2. Assembling apparatus as specified in claim 1 wherein said limiting means comprise a ratchet type latch means permitting free movement of said second jaw into assembling position but limiting movement of said second jaw away from assembling position toward said first jaw member until released by said releasing means.

3. Assembling apparatus comprising jaw members for resiliently gripping an article, means for moving one of said jaw members positively from an article receiving position to an assembling position, means resiliently biasing the other of said jaw members toward said one jaw member and from an assembling position to an article receiving position, plunger means for removing an article from said jaw members in the assembling positions thereof, means removably positioned in the path of a portion of said other jaw member for limiting the movement of said other jaw member toward said one jaw member thereby to prevent said other jaw member from engaging said plunger means when said plunger means remove an article from said jaw members, and releasing means for moving said limiting means out of the path of said other jaw member after said plunger means have been withdrawn from between said jaw members to permit said biasing means to move said other jaw member to said article receiving position thereof.

4. Assembling apparatus as specified in claim 3 wherein said limiting means comprise a ratchet type latch means permitting free movement of said other jaw member from said article receiving position thereof to said assembling position thereof but limiting movement of said other jaw member from said assembling position thereof toward said one jaw member until released by said releasing means.

References Cited in the file of this patent

UNITED STATES PATENTS

| | | |
|---|---|---|
| 688,026 | Marks | Dec. 3, 1901 |
| 1,964,434 | Holmes | June 26, 1934 |
| 1,971,576 | Nelson | Aug. 28, 1934 |
| 1,993,754 | Smith | Mar. 12, 1935 |